United States Patent [19]
Wasserman et al.

[11] Patent Number: 5,529,348
[45] Date of Patent: Jun. 25, 1996

[54] SPRING LOCK CONNECTOR

[75] Inventors: Stephen P. Wasserman; Todd S. Alexander, both of Van Wert, Ohio

[73] Assignee: Dana Corporation, Toledo, Ohio

[21] Appl. No.: 394,452

[22] Filed: Feb. 27, 1995

[51] Int. Cl.$^6$ ............................................. F16L 13/02
[52] U.S. Cl. .................................. 285/286; 285/388
[58] Field of Search ........................... 285/305, 387, 285/388, 286; 403/350

[56] References Cited

U.S. PATENT DOCUMENTS

| | | | |
|---|---|---|---|
| 408,835 | 8/1889 | Grafton | 403/358 |
| 769,896 | 9/1904 | Gapp | 285/388 |
| 798,078 | 8/1905 | Simpson | 285/388 |
| 1,649,525 | 11/1927 | Herold . | |
| 1,675,808 | 7/1928 | Kliss | 285/388 |
| 1,958,906 | 5/1934 | Ard . | |
| 2,438,107 | 3/1948 | Babbitt | 285/388 |
| 3,138,188 | 6/1964 | Tuozzo et al. . | |
| 3,347,293 | 10/1967 | Clark . | |
| 3,606,402 | 9/1971 | Medney | 285/305 |
| 4,435,005 | 3/1984 | Berger et al. | 285/388 X |

FOREIGN PATENT DOCUMENTS 671480  5/1952  United Kingdom ............... 285/388

*Primary Examiner*—Dave W. Arola
*Attorney, Agent, or Firm*—Millen, White, Zelano & Branigan

[57] ABSTRACT

A spring lock nut assembly for coupling a tube to another member such as a valve, manifold, other tube or the like, includes a tail piece which is brazed onto the tube, a spring lock wire and a spring lock nut. The spring lock wire is diamond-shaped in cross-section and has two surfaces received in an internal V-shaped groove in the lock nut. The remaining two surfaces of the lock wire project from the V-shaped groove. One of the surfaces of the lock wire which projects from the groove projects at an angle of about 45° and abuts a 45° shoulder on the tail piece. This abutment prevents the spring lock nut from being removed from the tube but allows the spring lock nut to rotate so as to effect a threaded coupling with the other member.

8 Claims, 7 Drawing Sheets

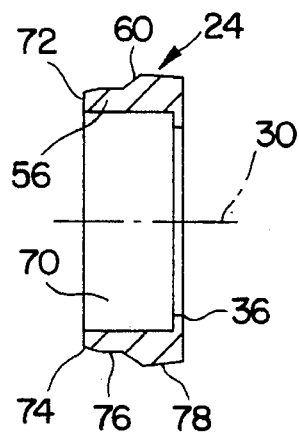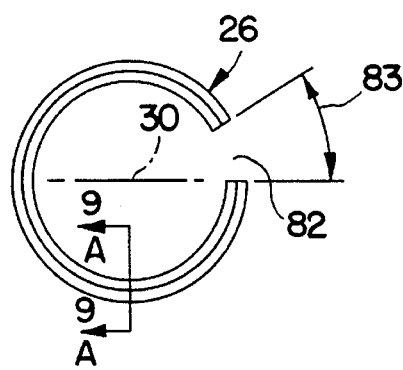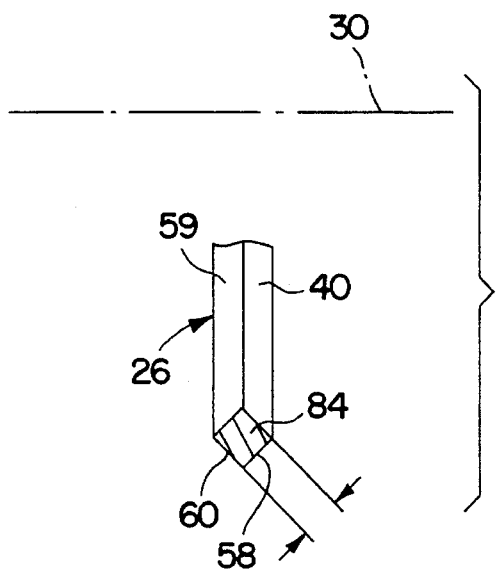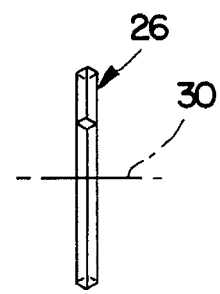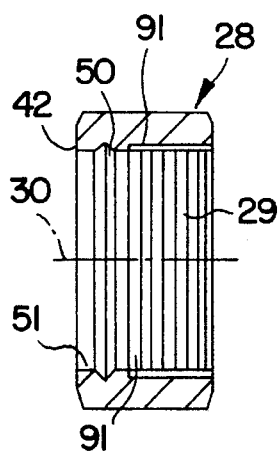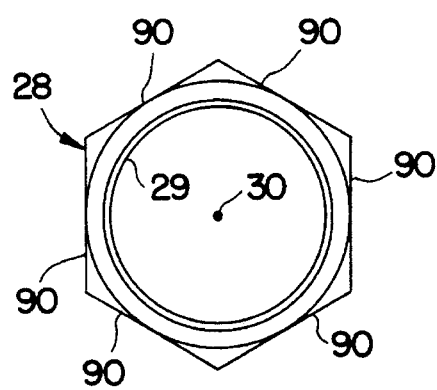

5,529,348

SPRING LOCK CONNECTOR

FIELD OF THE INVENTION

The present invention relates to a spring lock connector. More particularly, the present invention relates to a spring lock connector for connecting the tail piece of a tube to a coupling member such as a lock nut.

BACKGROUND OF THE INVENTION

Tubular members, such as metallic tubes, are coupled to other tubular members or ports in devices such as valves, vehicle brakes, pumps and the like, by threaded nuts. Typically, the threaded nuts rotate with respect to the tubular members in order to establish a threaded connection without having to rotate the tubular members. Typically, a crimp, removable staple or a round wire nut is utilized on the end of tubular members.

For size 24 tubes, a captive nut is utilized instead of a wire nut and crimp nuts are not used. Consequently, a captive nut must be installed during assembly of the components prior to brazing. The brazing process causes warping of the captive nut and thread distortion. When used with size 24 tubes, crimp nuts have a tendency to flex under SAE specific torque loads resulting in fitting failures. The staple-type securing mechanism is not intended to be a permanent attachment and is not therefore not used. Wire nuts of a circular cross-section have been considered for a permanent coupling of lock nuts in this situation, but upon application of an impulse, the round wire nut may back out of the retaining groove, allowing failure of the coupling. While these difficulties arise with size 24 tube couplings, they are also a consideration with couplings for tubes of other sizes.

In view of the aforementioned considerations, there is a need for a spring lock configuration in which the lock nuts are inexpensively and reliably attached to tubular members.

SUMMARY OF THE INVENTION

It is a feature of the present invention to provide a new and improved spring lock connector which is relatively easy to assemble, inexpensive and reliable.

The present invention is directed to an assembly comprising a tail piece for mounting on a tube, a spring lock wire and a lock nut retained on the tail piece by the spring lock wire. The improvement of the present invention comprises an internal V-shaped groove in the lock nut with the spring lock wire being configured with a polygonal cross-section for receipt in the V-shaped groove. A shoulder on the tail piece extends outwardly and has a surface cooperating with a complementary surface on the spring lock wire, allowing the lock nut to rotate with respect to the tail piece for threadably coupling the tube with the other member.

In a more specific aspect, the spring lock wire is diamond-shaped in cross section with four surfaces, two of which are received in the internal V-shaped groove in the lock nut and at least one of which projects from the V-shaped groove and engages the shoulder on the tail piece.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 7 is a side elevation of the tail piece;

FIG. 8 is a front view of the spring lock wire;

FIG. 9 is an enlarged view of a section of the spring lock wire taken long line 9—9 of FIG. 8;

FIG. 10 is a side view of the spring lock wire;

FIG. 11 is a side elevation of the spring lock nut; and

FIG. 12 is an front view of the spring lock nut,

DETAILED DESCRIPTION

Figure 1:
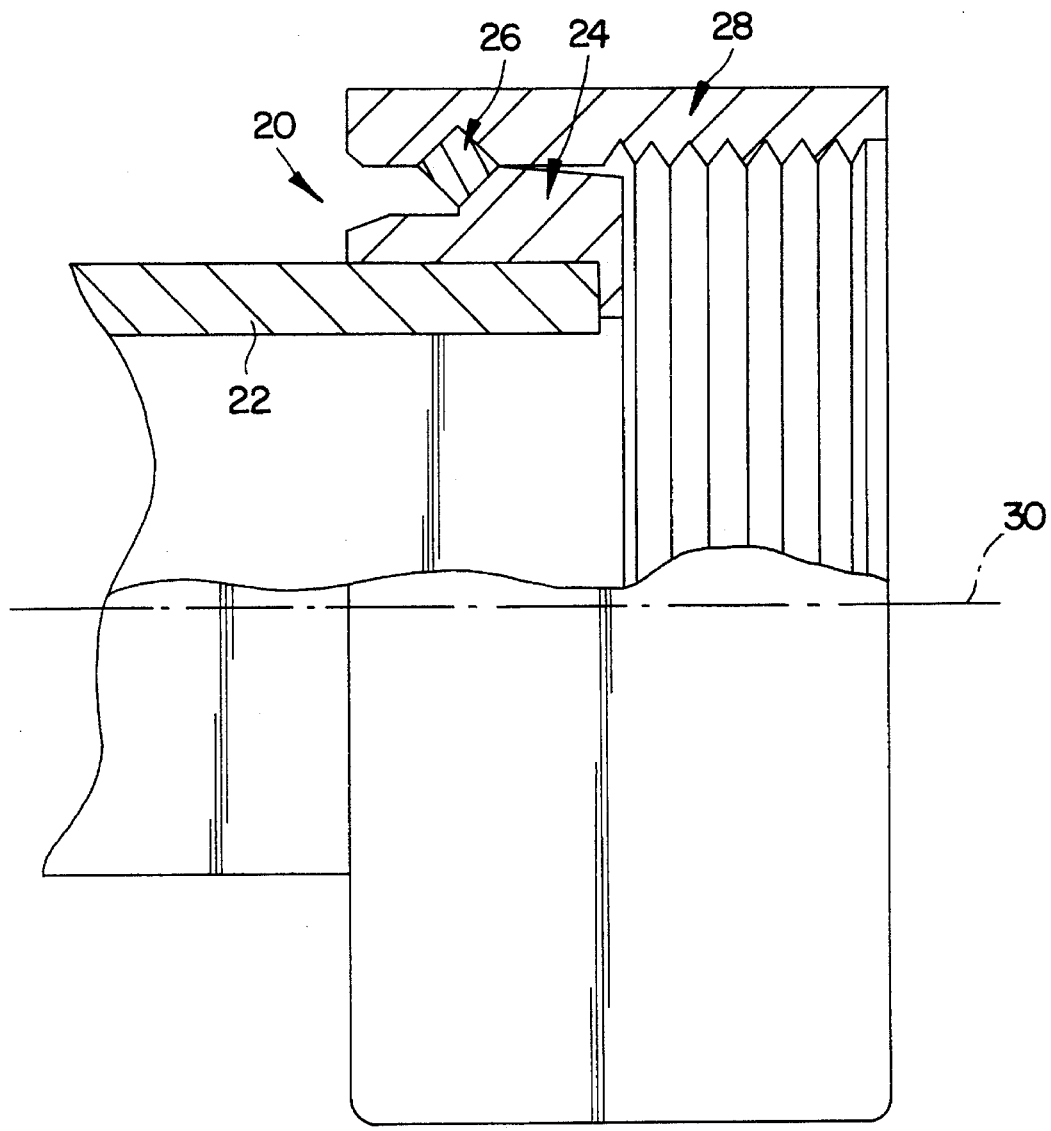
FIG. 1 is a side view, partially in elevation, of a spring lock nut assembly configured in accordance with the principles of the present invention.

Referring now to FIG. 1, there is shown a spring lock nut assembly 20 comprised of a metal tube 22, a tail piece 24, a spring lock wire 26 and a spring lock nut 28. The spring lock nut 28 is retained by the spring lock wire 26 for rotation on and respect to the tail piece 24 which is brazed to the metal tube 22 so that the spring lock nut can rotate around common axis 30 of the assembly and each of its components without having to rotate the tube 22.

Figure 2:
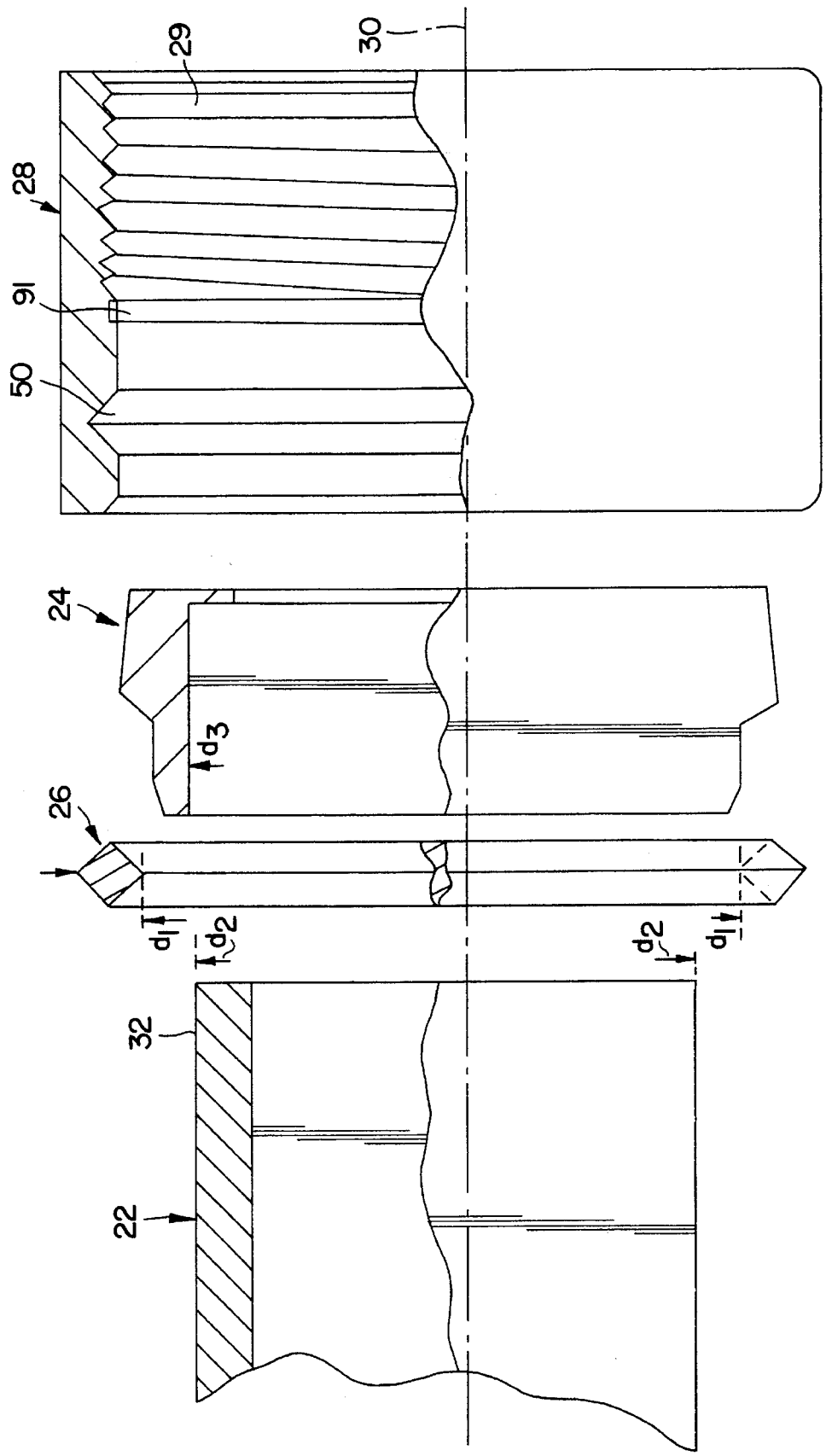
FIG. 2 is an exploded view, partially in elevation, of the components of the spring lock nut assembly of FIG. 1.

Referring now to FIG. 2, where the components of the assembly 20 are shown separated, it is seen that the components are separately fabricated and are aligned with the common axis 30 for assembly upon axial displacement. The spring lock wire 26 has a relaxed inside diameter $d_1$, which is substantially greater than the outer diameter $d_2$ of the metal tube 22, while the tail piece 24 has an inner diameter $d_3$ substantially equal to the outer diameter $d_2$ of the metal tube.

Figure 3:
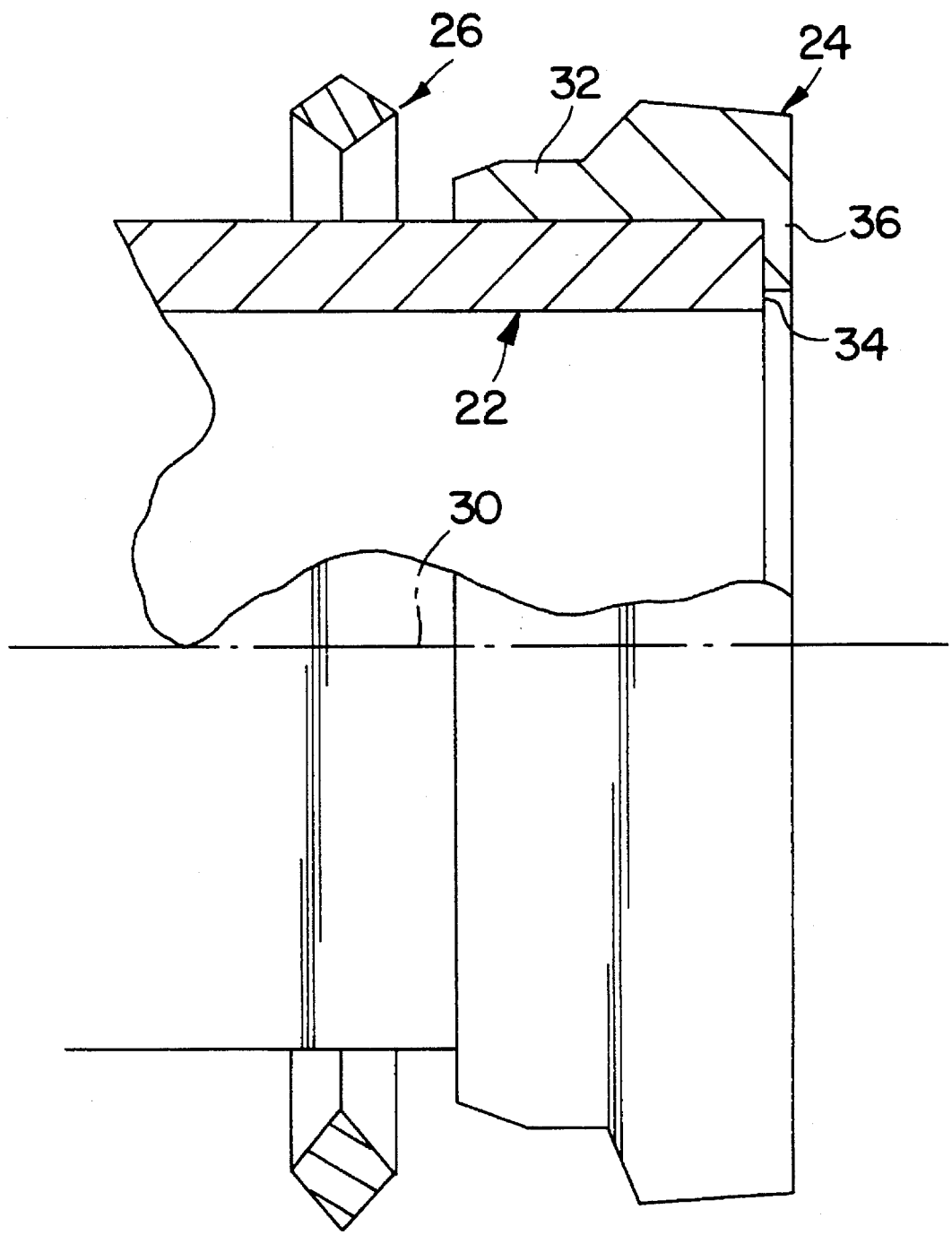
FIG. 3 is a side view, partially in elevation, showing a subassembly of the present invention wherein a spring lock wire and tail piece are assembled on a tube.

Referring now to FIG. 3, the tail piece 24 is slid over the metal tube and braised thereto with the inside diameter $d_3$ abutting the outer surface 32 of the metal tube. The end 34 of the metal tube 22 abuts an annular shoulder 36 on the tail piece 24 to axially locate the tail piece on the metal tube. The spring lock wire 26 is then slipped over the tailpiece 24.

Figure 4:
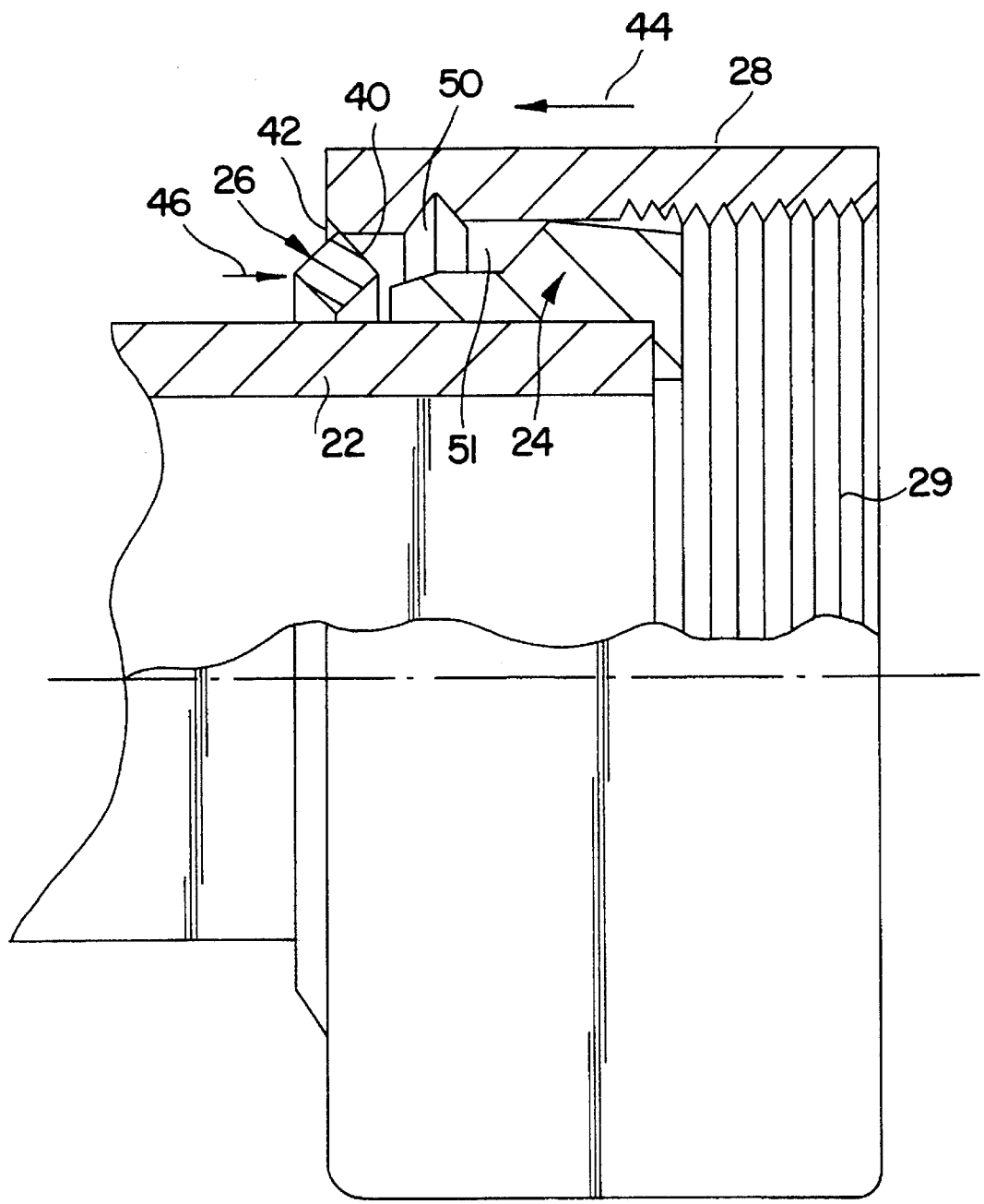
FIG. 4 is a side view, partially in elevation, showing a lock nut being assembled on the subassembly of FIG. 3.

Referring now to FIG. 4, the spring lock nut 28 is then slid axially over the tail piece 24 and engages a diagonal surface 40 on the spring lock wire 26 with a chamfered surface 42. Both the surface 40 and the chamfered surface 42 are oriented at 45° with respect to the axis 30 so that the chamfered surface serves as a cam surface for applying a compressive force against the surface 40. This results in the spring lock wire 26 decreasing in diameter so that the spring lock nut 28 can slide over the spring lock wire. This is accomplished by either moving the spring lock nut 28 in the direction of arrow 44 while holding the spring lock wire 26 stationary or while applying a force to the spring lock wire in the direction of the arrow 46.

Figure 5:
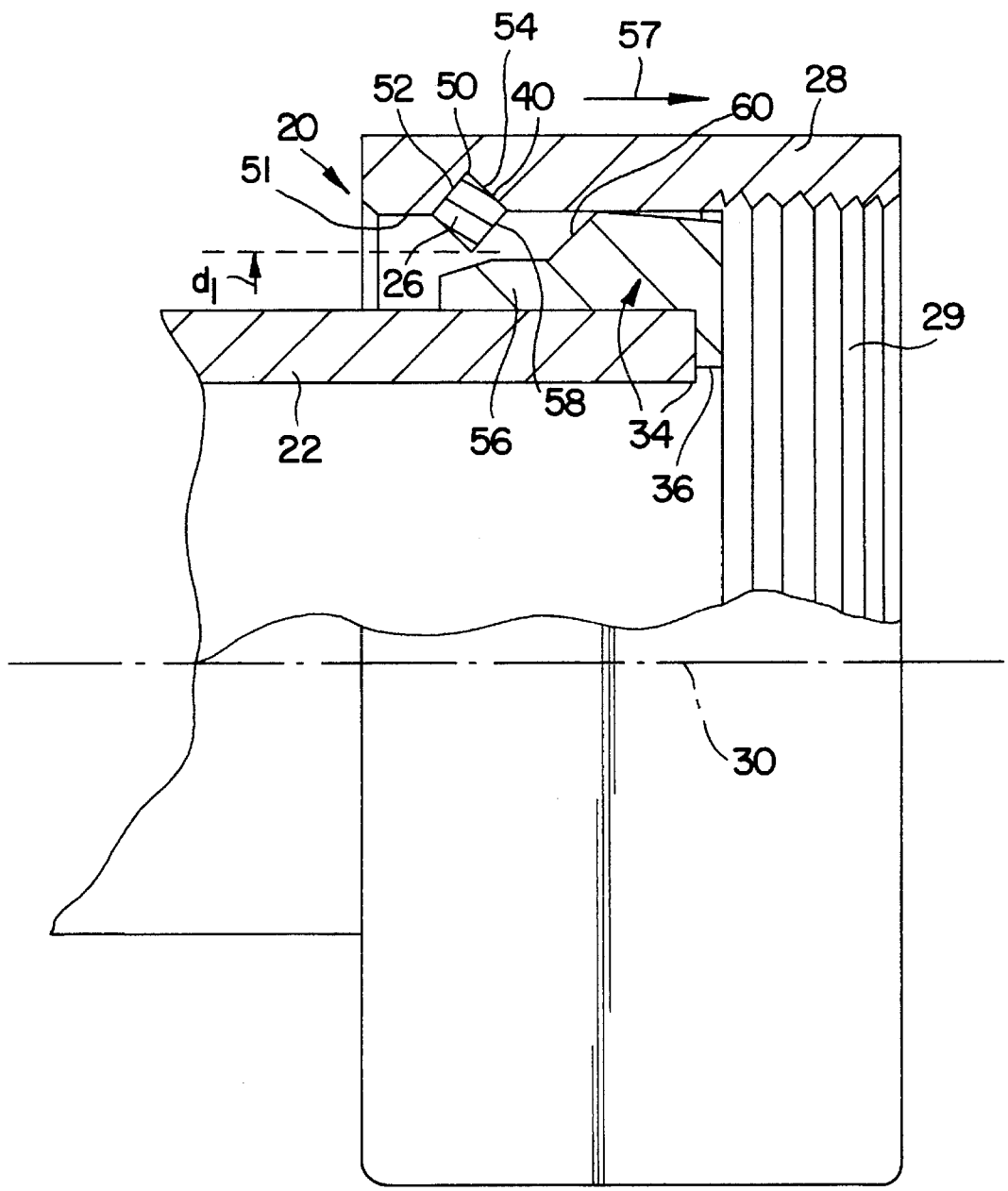
FIG. 5 is a side view, partially in elevation, showing the lock nut after it has captured the spring lock wire.

Referring now to FIG. 5, it is seen that the spring lock wire 26 has expands into a V-shaped groove 50 formed in a cylindrical portion 51 in the spring lock nut 28. The V-shaped groove 50 has first and second walls 52 and 54 oriented at 45° and 135°, respectively, with respect to the common axis 30. When the spring lock wire 26 is expanded from the FIG. 4 to the FIG. 5 position, the inside diameter $d_1$ of the spring lock wire is slightly greater than the outside diameter of a trailing first portion 56 of the tail piece 26. By continuing to move the spring lock nut 28 in the direction of arrow 57, the assembly 20 assumes the configuration of FIG. 6, wherein projecting surfaces 58 and 59 of the spring lock wire 26 extend from the V-shaped slot 50 with surface 58 abutting a shoulder 60 of the tail piece. Both the projecting surface 58 and shoulder 60 extend at 45° with respect to the axis 30 and function to stop further movement of the lock nut 28 in the direction of arrow 57.

Figure 6:
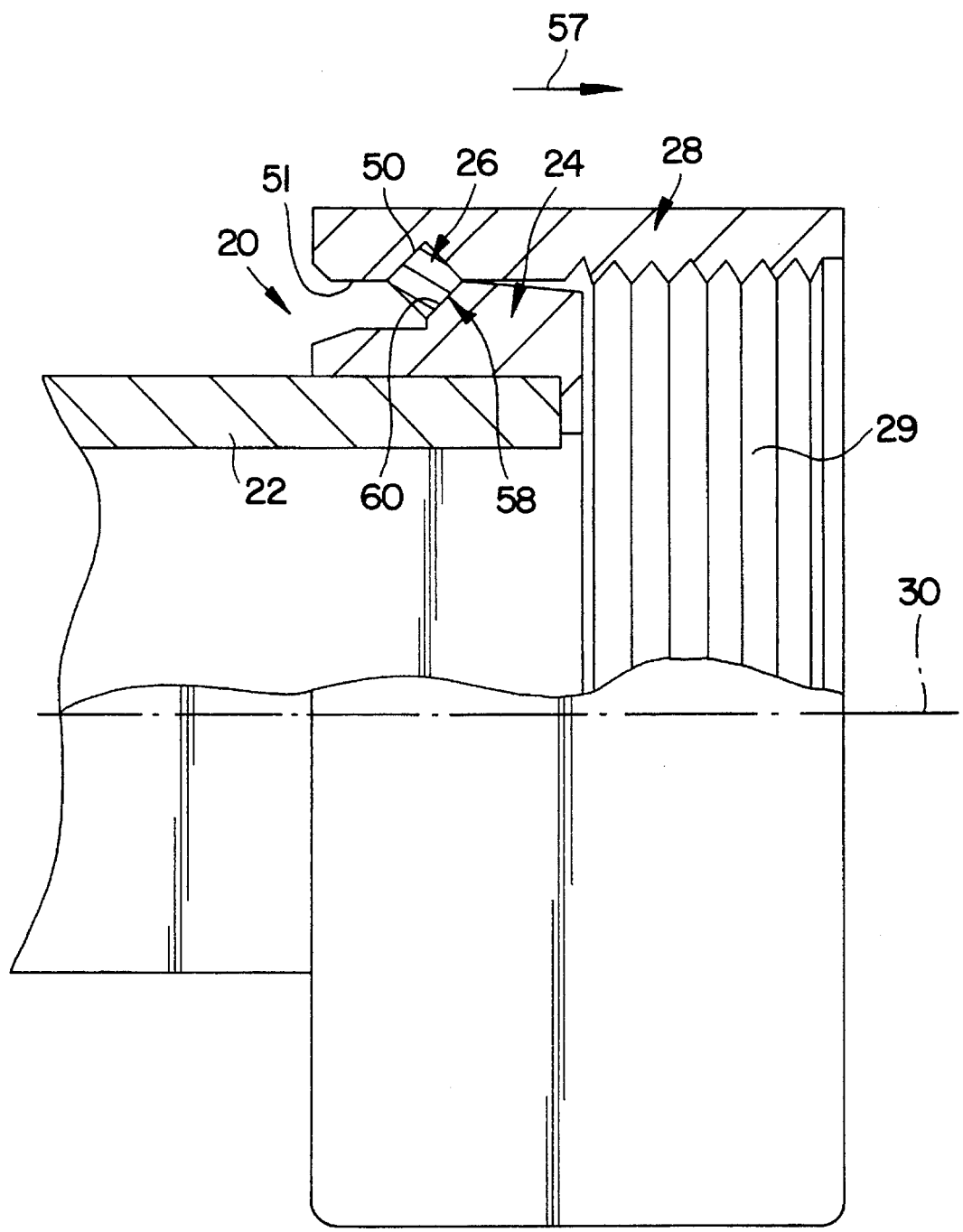
FIG. 6 is a view identical to FIG. 1 showing the complete spring lock nut assembly.

The assembly 20 of FIGS. 1 and 6 is now ready for use in the field. If one attempts to force the lock nut 28 further to the right, engagement between the surface 58 of the spring lock wire and the shoulder 60 causes the spring lock wire 26 to jam tightly in the V-shaped groove 50 to resist further axial movement. In addition, the diamond shaped cross-section of the spring lock wire 26 prevents the spring lock wire from rolling out of the V-shaped groove 50. Lock nut 28 is, however, free to rotate so that threads 29 can threadably mate with a complementary male fitting (not shown) received within the lock nut 28.

Referring now to FIG. 7, where the tail piece 24 is shown isolated and substantially to scale, the tail piece is configured as a collar having a bore 70 which extends to the annular flange 36. The tailpiece is slid onto the metal tube 22 for brazing thereto. The first trailing portion 56 of the tail piece 24 has a radial end surface 72 which extends substantially normal for the axis 30 and a slight ramp portion 74 which is about 0.100 inch long and rises about 0.66 inch to an annular land surface 76. The annular land surface 76 adjoins the 45° shoulder 60 which adjoins a slightly frustoconical surface 78 that forms a second portion of the tail piece 24. The frustoconical surface 78 tapers about 0.030 inch to facilitate sliding of the lock nut 28 thereover during assembly of the spring lock nut assembly 20.

Referring now to FIGS. 8, 9 and 10, it is seen that the spring lock wire 26 has a gap 82 therein when in the relaxed state. The gap 82 allows the spring lock wire 26 to contract from its relaxed diameter to the FIG. 4 diameter by narrowing the gap as the spring lock nut 28 slides over the spring lock wire to capture the spring lock wire (see FIG. 4). When the spring lock wire 26 aligns with the V-shaped groove 50, the spring lock wire expands toward its relaxed diameter and seats in the V-shaped groove.

As is seen in FIG. 9, the spring lock wire has a square cross-section 84 which is tilted 45° with respect to the axis 30 so as to present a diamond shape when considered from the radial direction with respect to the axis 30. The four faces 40, 58, 59 and 60 of the spring lock wire 26 are each 0.125 inch, while the outside relaxed diameter of the spring lock wire is 2.095 inch and the inside relaxed diameter is 1.738 inch. Preferably, the gap 82 defines an arc 83 which extends about 36°. As is seen in FIG. 10, the spring lock wire 26 is radially symmetrical about the axis 30 so as to have no axially directed biasing component.

Referring now to FIGS. 11 and 12, where the spring lock nut 28 is shown, it is seen that the lock nut 28 is a hex nut with six planar surfaces 90 for gripping with a wrench to turn the spring lock nut 28 with respect to the tube 22 and the tail piece 24 brazed to the tube. Between the threaded portion 29 and the cylindrical portion 51 containing the V-shaped groove 50, there is a small step 91 which steps up to the cylindrical portion. In order to cooperate with the 1.500 inch outer diameter tube 22 and the tail piece 24 and spring lock wire 26 of the dimensions discussed, the lock nut 28 has an inner diameter of about 1.912 inch which has an outer diameter normal to the faces 90 of about 2.250 inches and a length of about 1.188 inches.

While the aforedescribed configuration is especially useful for connecting 24 size tubing, it may be used for tubing of other sizes.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a permanent tube coupling assembly assembled about an axis, the assembly comprising a separate metal tail piece for mounting on a metal tube at an open end of the tube, a metal spring lock wire and a lock nut retained on the tail piece by the spring lock wire, the improvement comprising:

a circular V-shaped groove in the lock nut, V-shaped groove having surfaces which extend obliquely with respect to the axis;

the spring lock wire being substantially circular in overall shape, diamond-shaped in cross-section with four surfaces, all of which are oblique with respect to the axis, two of which surfaces are received in the V-shaped groove and complement the V-shaped groove in the lock nut by extending parallel to the surfaces of the groove and at least one of which surfaces projects from the groove; and a shoulder on the tail piece extending outwardly therefrom, the shoulder having a surface engaging the surface on the spring lock wire which projects from the groove, whereby the lock nut can rotate with respect to the tail piece to threadably couple the tube with the other member providing a coupling which withstands preloading forces and constant screw thread pressure.

2. The improvement of claim 1, wherein the shoulder on the tail piece is oriented at about 45° with respect to the axis of the assembly.

3. The improvement of claim 2, wherein the diamond-shaped cross-section is square.

4. The improvement of claim 3, wherein the tube on which the tail piece is mounted is metal and wherein the tube is received within the tail piece and fixed thereto by brazing.

5. The improvement of claim 1, wherein the tube on which the tail piece is mounted is metal and wherein the tube is received within the tail piece and fixed thereto by brazing.

6. The improvement of claim 1, wherein the spring lock wire is metal and has a gap therein when in its relaxed state, which gap allows the spring lock wire to reduce and expand its diameter to facilitate assembly of the coupling.

7. The improvement of claim 6, wherein the tail piece has a first portion and second portion, the first portion having a diameter less than the second portion and less than the interior diameter of the spring lock wire when the spring lock wire is seated in the V-shaped groove.

8. The improvement of claim 7, wherein the first portion of the tail piece extends away from the open end of the tube.

\* \* \* \* \*